Jan. 19, 1971     D. P. BENNETT, JR     3,555,826

INVERSE HYBRID ROCKET

Filed Dec. 30, 1968     5 Sheets-Sheet 1

INVENTOR.
DONALD PERRY BENNETT, JR.
BY Martin E Gerry

AGENT.

Jan. 19, 1971     D. P. BENNETT, JR     3,555,826
INVERSE HYBRID ROCKET

Filed Dec. 30, 1968     5 Sheets-Sheet 3

INVENTOR.
DONALD PERRY BENNETT, JR.
BY Martin E Gerry

AGENT.

Jan. 19, 1971   D. P. BENNETT, JR   3,555,826
INVERSE HYBRID ROCKET
Filed Dec. 30, 1968   5 Sheets-Sheet 5

INVENTOR.
DONALD PERRY BENNETT, JR.
BY Martin E Gerry
AGENT.

United States Patent Office 3,555,826
Patented Jan. 19, 1971

3,555,826
INVERSE HYBRID ROCKET
Donald Perry Bennett, Jr., Diamond Bar, Calif., assignor of one-half to Martin E. Gerry, Santa Ana, Calif.
Continuation-in-part of application Ser. No. 611,188, Nov. 14, 1966, which is a continuation-in-part of application Ser. No. 480,080, Aug. 16, 1965. This application Dec. 30, 1968, Ser. No. 787,789
Int. Cl. F02k 9/02, 7/10
U.S. Cl. 60—251                                    10 Claims

ABSTRACT OF THE DISCLOSURE

An inverse hybrid rocket where a fluid fuel reacts hypergolically in a combustion chamber with a non-fluid oxidizer to produce energy in the form of high temperature gases as reaction products, and a mechanism through which the reaction products are ejected to provide power or thrust to the rocket. Several exemplary embodiments are disclosed, one of the embodiments incorporating a two-part coaxial injector mechanism for controlling metering of the fuel to the combustion chamber. The injector mechanism has the capability of ejecting an inner part of the two-part injector when a control device for controlling fuel metering rotates the inner part of the injector a full semicircular distance, thereby disposing of the remaining fuel in ignited form over a predetermined geographical area at the termination of flight of the rocket. Other applications of the rocket include propelling a vehicle, driving a turbo generator, providing aircraft propulsive power and preventing flame-out of an air-breathing jet engine.

COPENDING RELATED APPLICATION

This application is a continuation-in-part of copending application Ser. No. 611,188 filed Nov. 14, 1966, now Pat. No. 3,421,323.

This application is also a continuation-in-part of application Ser. No. 480,080, filed Aug. 16, 1965, (now abandoned) which is the parent application of application Ser. No. 611,188.

BACKGROUND OF THE INVENTION

Inverse hybrid rockets wherein a fluid fuel and a solid (non-fluid) oxidizer are used, have a disadvantage of not being hypergolic. This means that the fuel does not react on contact with the oxidizer, resulting in the requirement for additional ignition aids such as igniters, high voltage power supplies and the like for powering the igniters and in general require complexx ignition systems which serve to lower the reliability of fuel combustion and in addition increases the costs of the rocket.

Other disadvantages in hybrid rockets include the use of fuels and oxidizers which are corrosive to the fuel and oxidizer retaining means, to the fuel distribution means and to the fuel injection means, thereby making the rocket undependable when a given amount of time has elapsed after loading of the rocket with the fuel and oxidizer components, thereby necessitating periodic replacement of the rocket or of the fuel and oxidizer components therein, and thereby increasing the maintenance cost of the weapons system of which the rocket is an operating component, usually used for delivery of a warhead or related weaponry.

Still other disadvantages in hybrid rockets include the use of highly refined and purified fuel and oxidizer components which are expensive to produce, are generally unstable when individually considered, and require exceptionally clean distribution systems to not only insure proper fuel ignition, but to prevent explosion of the fuel within the fuel containing chamber or in the fuel distribution prior to injection into the combustion chamber. These disadvantages make necessary special handling and storing equipment and procedures, and create logistic problems in military operations.

Another disadvantage of hybrid rockets is their inability to be utilized as a power source for propelling a vehicle including aircraft, inability to be used for driving a turbo generator, and incapability of utilization as a flame-out prevention device in an air breathing jet aircraft and as a fuel conditioner therefor.

Still other disadvantages of hybrid rockets is lack of a dual purpose fuel injection system, the absence thereof preventing the fuel from being initially utilized as a means for propelling the rocket and thereafter, at a predetermined military target area not enabling the disposing of the remaining fuel in ignited form over the predetermined designated target area.

OBJECTIVES AND INVENTION SUMMARY

An objective of this invention is to provide an inverse hybrid rocket wherein a fluid fuel and a non fluid oxidizer are hypergolic upon contact of the fuel with the oxidizer so as to obviate the need for auxiliary ignition systems, to increase the reliability of fuel ignition and hence rocket operation, and to decrease the costs of manufacture, cost of maintenance, and cost of military operations utilizing this type of rocket.

Another objective of this invention is to utilize a non fluid oxidizer, and a group of hydrocarbon-type fuels which do not corrode or react with the material of the fuel compartment, the fuel injector mechanism and control devices therefor, thereby assuring that the rocket will function dependably even if it had been in readiness for launching and loaded with the oxidizer and fuel for many years. This objective serves to make it unnecessary for virtually ever replacing the rocket or the fuel or oxidizer components, once loaded, and therefore provides for a reliable delivery means for a warhead as an operating component of a weapons system, or other tactical military components transported thereby.

Still another objective relates to the purity of the chemical compounds comprising the fuel and oxidizer components. A purpose of this invention is therefore to utilize such oxidizers and fuels which will develop high energy and thrust and at the same time make possible the use of commercially available compounds rather than chemically pure compounds or elements.

Therefore, it is an objective of this invention to avoid the use of chemically pure compounds or elements and use commercial grades of compounds or elements as the oxidizer and fuel components thereby avoiding the requirement for exceptionally clean interconnecting means and exceptionally clean fuel containers, since chemically pure fuel components and oxidizers will become contaiminated by mere contact with the surfaces of the interconnecting means and the walls of the containers. Avoiding chemically pure fuel and oxidizer components increases the reliability of the rocket by assuring reaction between the fuel and oxidizer components at all times.

Further objectives of the invention are the use of such fuels and oxidizers which will not explode due to contact with the material of the containers due to impurities of the container material, and to provide such fuel and oxidizer components which enable storing, handling, loading and utilizing the fuel and oxidizer components safely and as dictated by the logistics of military operations in which the hybrid rocket is utilized.

Still further objectives of the invention are to adapt the hybrid rocket to be utilized as a power source for propelling a vehicle, as a power source for driving a turbo generator for creating electrical power, and for utilization of the combustion chamber containing the oxidizer of the hybrid rocket as part of a fuel injection system of an air breathing jet engine for providing pyrophoric ignition of any unburned fuel contained in the jet engine assuring jet fuel ignition and avoiding jet engine flame-out.

Still further objectives and advantages of the invention is the provision of the hybrid rocket as a dual purpose vehicle; firstly, as a means for delivering a warhead or similar tactical payload to a predetermined military target area, and secondly, by providing an injector mechanism in the combustion chamber of the rocket motor that will permit the fuel remaining at flight termination of the rocket to be ejected from the rocket through the rocket motor in ignited form over the target area for scorching and burning the target area.

Briefly in accordance with the invention, in addition to providing commercially available non-fluid oxidizer components and a group of fuel components of the hydrocarbon class for hypergolic reaction with the oxidizer components, thereby making possible a reliable and relatively inexpensive rocket motor, the application of the principles of the rocket motor and uses of the rocket motor in other applications makes possible an energy or power source for preventing flame-out in a jet engine and for providing a fuel preconditioner as well as a source of auxiliary or direct power for driving any vehicle including aircraft vehicles, and for driving a turbo generator for generating electrical power.

Examples of types of fluids that may be used as fuel components of the rocket motor are hydrogen, sodium, potassium, alcohol, gasoline, jet petroleum, rocket petroleum, diesel fuel, napalm or paraffin, and combinations thereof.

Examples of types of non-fluids that may be used as oxidizer components of the rocket motor are chromium trioxide, chromic acid anhydride, chromic anhydride or chromic acid. Compounds of iodine may also be used as an oxidizer.

Experiments were performed by the inventor constituting a propellant feasibility demonstration, wherein ethyl alcohol reacted with chromium trioxide upon contact with each other in a demonstrated hypergolic reaction. Another experiment was performed by the invention, reusing the container structure of the rocket motor, wherein ethyl alcohol was injected through a flexible hose connected to a combustion chamber which chamber was loaded with chromium trioxide. Hypergolic action occurred, smoke and flame were expelled accompanied by loud noises indicating vigorous chemical reaction internal to the chamber in the container structure, and power or energy was developed. Chromium trioxide oxidizer was used with ethyl alcohol fuel inasmuch as chromium trioxide is a vigorous oxidizing agent that causes spontaneous combustion of the ethyl alcohol fuel hypergolically.

The reaction that occurred may be described by the following equation which shows a non-reversible chemical reaction:

$$2C_2H_5OH + 3CrO_3 \rightarrow CO_2 + 3CO + 6H_2O + 3Cr$$

The type of ignition reaction wherein the fuel ignites on contact with the oxidizer is known as a hypergolic reaction.

The substances of the oxidizer group above mentioned are each high energy containing substances and therefore during a combination with any of the aforesaid fuels are combinable in a hypergolic reaction.

In the experiments involving the reaction products of carbon monoxide, carbon dioxide, and water or steam thus formed, were at extremely high temperatures, and possibly the element chromium which had been reduced from the oxides of chromium, was exhausted. The water formed was also exhausted, but being at a high temperature, the water was in the form of superheated steam. It is therefore reasonable that one important application of this energy source could be in the use as a means for driving the blades of a turbine due to the high energy exhaust products ejected from a nozzle or similar ejection means. Another application being as a self-contained propulsion device wherein again the high energy exhaust products through the ejection means are used to drive a device which could be a rocket or auxiliary jet rocket for use in aircraft or for use in other rockets either to restart rocket or jet engines upon flame-out or for assistance in takeoff, or for temporay increase in specific impulse of these rockets or aircraft.

IN THE DRAWINGS

Figures 9, 10:
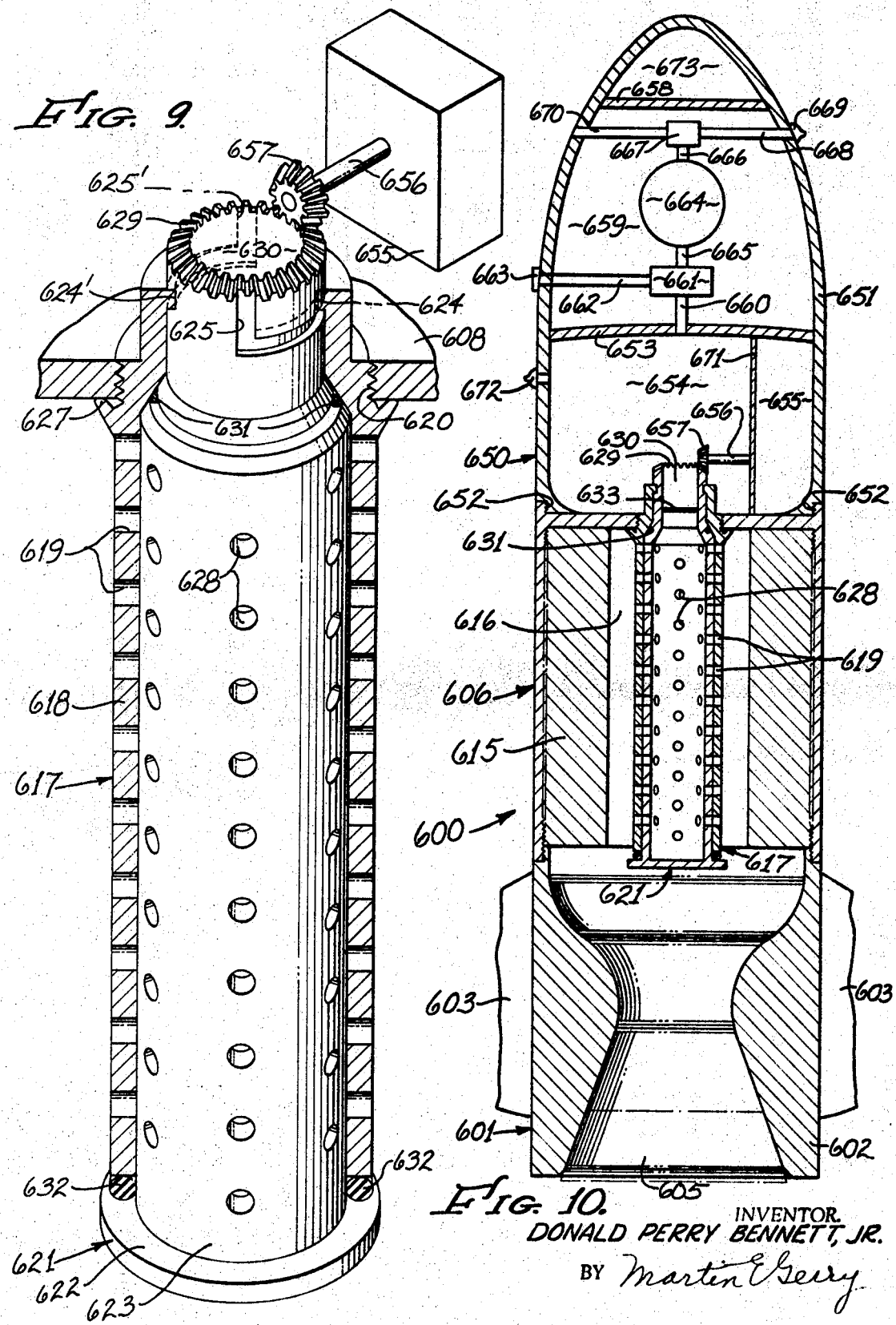

FIG. 9 is a perspective enlarged view of a portion of the rocket motor chamber, the fuel injector mechanism and control means for the fuel injector mechanism of the alternate exemplary embodiment; and FIG. 10 is a longitudinal cross-section view of the alternate exemplary embodiment, showing the relationship of the fuel injector with respect to the rocket motor combustion chamber and the exhaust nozzle portion, and includes the fuel compartment of the rocket fuselage wherein the control means for driving a rotatable portion of the fuel injector is retained.

EXEMPLARY EMBODIMENT OF AN INVERSE HYBRID ROCKET OR ENERGY SOURCE

Referring to FIGS. 1, 2, 3, 4 and 5, fuselage structure 1 has nozzle 2 mechanically attached to base 5, and base 5 has an aperture at its center through which the ignited fuel gases exhaust. Fuel loading port 3 is used for loading the fluid fuels by connecting a hose from an external fuel storage tank thereto. On completion of loading, fuel port 3 is mechanically sealed. The fuel is retained in fuel reservoir 18 and in fuel entry chamber 7. Port 4 is used for loading a compressed gas into a gas pressurizing chamber 20 by connecting a hose from an external pressure vessel thereto, and port 4 is thereafter sealed. Solid oxidizer 8, has a cylindrical aperture 6 along the length of its axis for providing a path for the fluid fuel to flow through and facilitate thorough hypergolic action, is located in an oxidizer compartment 25 of structure 1. Valve seat 9 has an aperture 10 which aperture is normally blocked by valve gate control rack 12. Teeth of pinion 13 always cooperate with and engage teeth of rack 12, and pinion 13 is attached to shaft of valve control motor 14 for controlling the quantity of fuel flowing through aperture 10 by means of automatic valve control mechanism 15 to which the valve control motor 14 is electrically connected. The automatic valve control mechanism 15 is located in control compartment 24, which compartment is enclosed by means of enclosure 17, control mechanism 15 being remotely controlled by means of radio command signals impressed upon remote control antenna 16 which is electrically connected to a communications link which is an integral part of the automatic valve control mechanism 15, and which communications link translates the received signals into commands, activating the automatic valve control mechanism 15, thereby controlling the fuel flow. Command signals may be optionally manually provided by means of a hard line electrical connection between automatic valve control mechanism 15 and a control means located in cabin 22, and manually operated by a human being in the case where the propulsion vehicle is a manned flight vehicle. The propulsion vehicle has payload chamber 11 in which particular payloads are retained, and fixed separator wall 23 between cabin 22 and payload chamber 11 is mechanically affixed to the wall of structure 1. Fixed separator wall 21 between gas pressurizing chamber 20 and cabin 22 is mechanically affixed to wall of structure 1. Movable separator piston disk 19 is located between fuel reservoir 18 and gas pressurizing chamber 20, the edges of disk 19 cooperating with the wall of structure 1, thereby causing disk 19 to be moved in a piston-like fashion when a pressure differential between fuel reservoir chamber 18 and gas pressurizing chamber 20 exists.

When a command signal is given to activate the automatic valve control mechanism 15, thereby applying power to valve control motor 14, which rotates pinion 13 counterclockwise, teeth of pinion 13 cooperating with teeth of rack 12 cause rack 12 to be translated to a given distance from its normally aperture 10 blocking position, thereby permitting fluid-fuel to flow through aperture 10 due to pressure differential between compartments 18 and 20, causing piston 19 to be moved, and forcing fluid-fuel through into aperture 6 of solid or non-fluid oxidizer 8 to ignite the fluid-fuel hypergolically, and to cause a chemical reaction to occur at high temperatures, and to cause energy to be expanded, causing violent combustion and an exhaust plume through nozzle 2 to propel the vehicle by virtue of the power and thrust developed.

The solid on non-fluid oxidizer used in the illustrated embodiment is chromium trioxide ($CrO_3$), and the fuel used in the experiment is ethyl alcohol ($C_2H_5OH$) in combination with each other to cause ignition of fuel hypergolically. As described above, the chemical reaction yields chromium (Cr), carbon monoxide (CO), carbon dioxide ($CO_2$), water ($H_2O$).

Instead of exhausting through the nozzle, the energy source at 100 and above described, may be used equally effectively as a power generator by piping the exhaust gases directly from the aperture at the center of base 5, into which the above mentioned nozzle is mechanically inserted and held to a turbine at 200 or to other power or prime moving means to drive the turbine or other prime moving means thereby generating electrical power.

The application of the energy source to jet fuel conditioning for use in conventional jet engines or similarly powered vehicles of all types effects two distinct improvements in the operation of these vehicles, namely, fuel performance and fuel consumption are markedly improved and the engine is rendered flameout-proof. Inasmuch as the fuel is hypergolic with air, autoignition is spontaneous and automatic even during flame-out conditions. Pyrophoric ignition of any unburned fuel of the jet engine is therefore provided by the reaction products resulting from the combination of the jet engine fuel with the oxidizer of the energy source. An additional safety feature which is quite unique in this application is that even though the fuel is hypergolic with air when it leaves the injector within the vehicle, it is non-hypegolic and quite conventional when in the fuel tanks and lines. The basic principle of fuel conditioning involves the use of the energy source which raises the temperature of the fuel to the point at which it is hypergolic with air and needs no other ignition device, electrical, pyrotechnic, hot wire, or similar ignition device. The flow rate of the jet fuel is adjusted by means of flow rate control valve 305 to provide the proper temperature with the minimum consumption of fuel in the energy source oxidizer chamber. Tailoring of the oxidizer grain geometry to provide the proper flow pattern may also be required in this application. It is anticipated that no more than ten percent of the fuel entering the chamber would be oxidized, but it should be emphasized that this consumption is not a loss because the heat energy produced is absorbed by the unburnt fuel and injected with it into the combustion chamber of the jet engine to do useful work. The non-fluid oxidizer is of course consumed during this application as a fuel conditioner, but the particular oxidizer component used, lends itself to storage and handling as long as simple precautions are respected. Oxidizer grains could be replaced in the chamber during refueling operations and different sized grain segments could be used to tailor the charge to the specific vehicle mission.

Another way of stating the application of jet fuel conditioning more simply, is that jet fuel is stored in the wing storage tank 301 of an aircraft as at 300, and is relatively safe although the fuel is flammable because it is stored at a temperature below its ignition temperature or flash point, and is relatively isolated from air. The jet fuel is then pumped to the jet engine 302. The jet engine is specially designed with the energy source of this invention as part of the fuel injector system. When the fuel enters the energy source, it reacts with the oxidizer. About ten percent of the above stated fuel component reacts hypergolically with the oxidizer within the oxidizer chamber of the energy source. This produces heat which is absorbed by the remaining ninety percent of the fuel component, elevating the temperature of the fuel component, in combination with the oxidizer component, and hence the reaction products produced thereby are at a temperature which is well above the ignition temperature of the fuel or its flash point. At this point, the hot mixture of fuel and combustion products are injected into the combustion chamber of the jet engine and therein mixed with air. Since the temperature of the mixture thus formed is already above the ignition point or flash point of the fuel, ignition takes place substantially instantaneously and automatically. This action is referred to as auto-ignition. Therefore, no auxiliary igniter such as a spark plug, squib, hot wire, pyrotechnic device, or auxiliary ignited gas jet is necesary for ignition of the fuels within the combustion chamber of the jet engine.

In the event that flight conditions of the jet aircraft do not require continuous fuel conditioning to sustain the combustion conditions of the jet engine, fuel may be conducted directly to the jet engine fuel injector by means of a by-pass valve 303 within by-pass line 304. The energy source is then used to start the jet engine or to restart the engine in the event of failure of the fuel to combust within the jet engine, or flame-out.

Continuous usage of the energy source in the jet engine makes possible flights of the jet aircraft at high speed and low altitudes without the necessity of complex adjustments to the jet aircraft engine so as to avoid flame-out. Conversely, the energy source is also applicable in a similar monner to jet aircraft for low speed and high altitude flights.

Application of the use of the inverse hybrid rocket to any type of transportation craft as at 400 is possible, and these craft may include missiles, water surface craft such as ships, underwater surface craft such as submarines, as well as space craft. Under conditions of usage, any combination of the aforesaid fuels and oxidizers, chemical reactions occur hypergolically.

Figure 1:
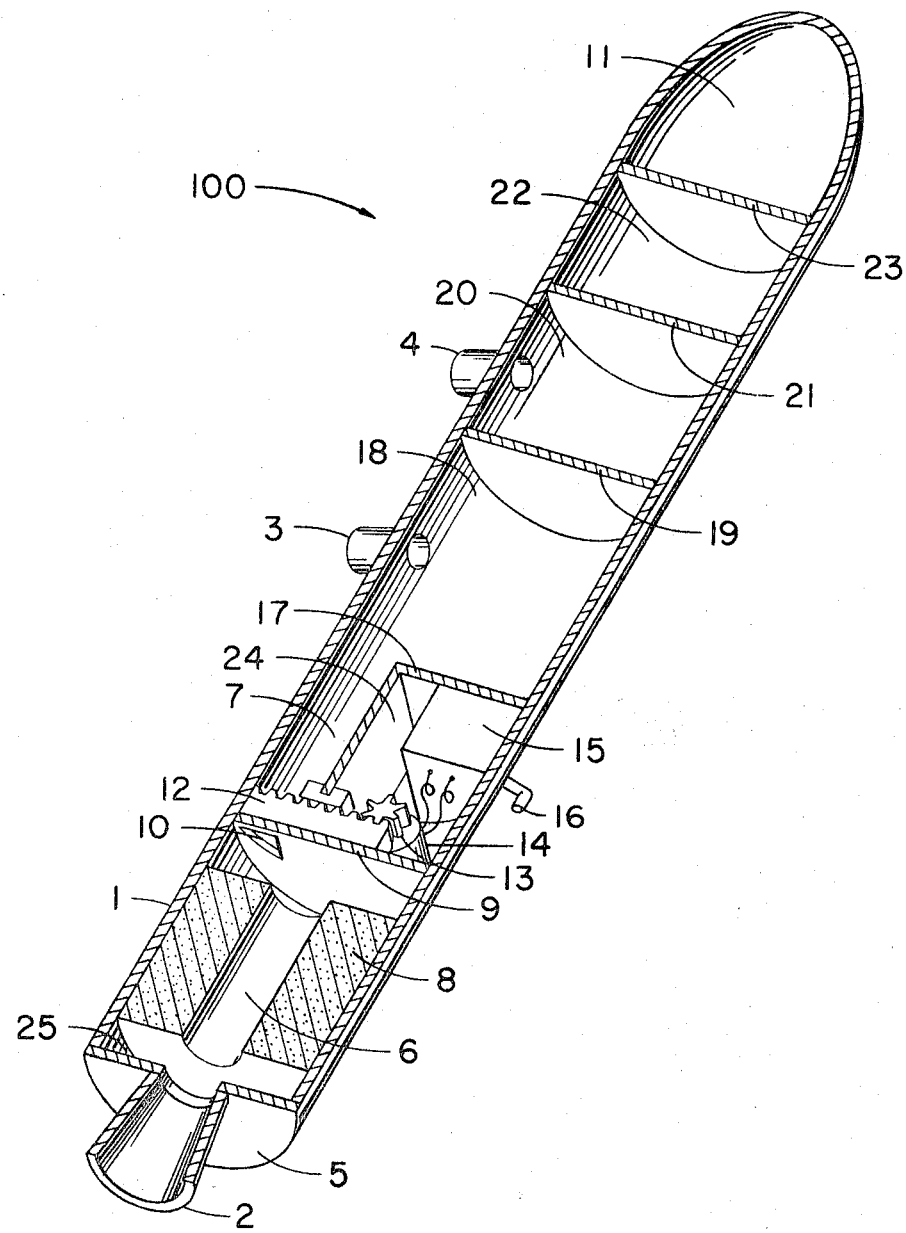
FIG. 1 is a perspective view, partially in cross-section of the inverse hybrid rocket or energy source, utilized as a propulsion vehicle in accordance with this invention.
Figure 2:
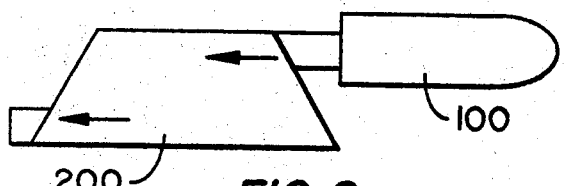
FIG. 2 is a plan view showing the energy source coupled to a turbine which includes an electrical power generator.
Figure 3:
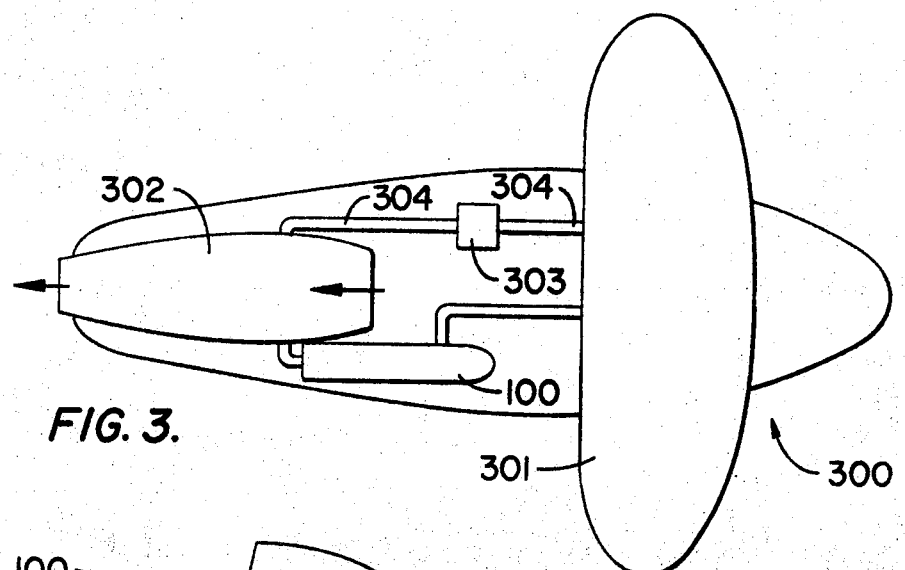
FIG. 3 is a plan view showing the energy source coupled to a jet engine for providing autoignition, flame-out proofing, and for acting as an auxiliary power means for the jet engine located in a jet aircraft.
Figure 4:
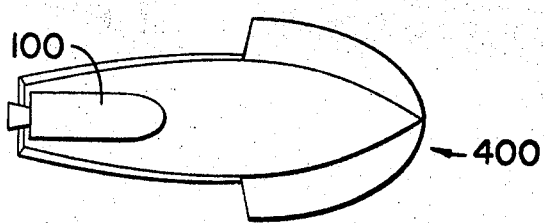
FIG. 4 is a plan view of a propulsion vehicle showing the energy source installed as a part thereof for propelling the vehicle.
Figure 5:
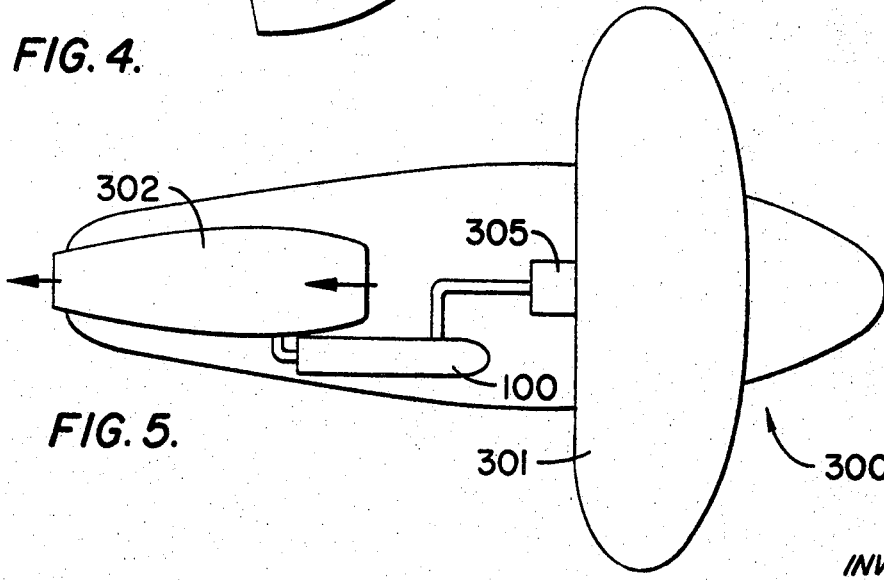
FIG. 5 is a plan view of a jet aircraft showing the energy source installed in the aircraft as part of the injector thereof for providing fuel conditioning for the jet engine.
Figure 6:
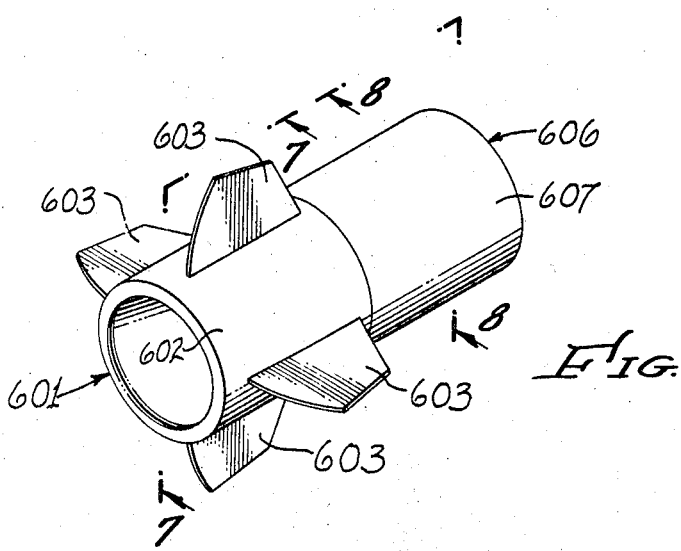
FIG. 6 is a perspective view of an alternate exemplary aft portion of a rocket including the exhaust nozzle portion and the rocket motor combustion chamber of the rocket.
Figure 7:
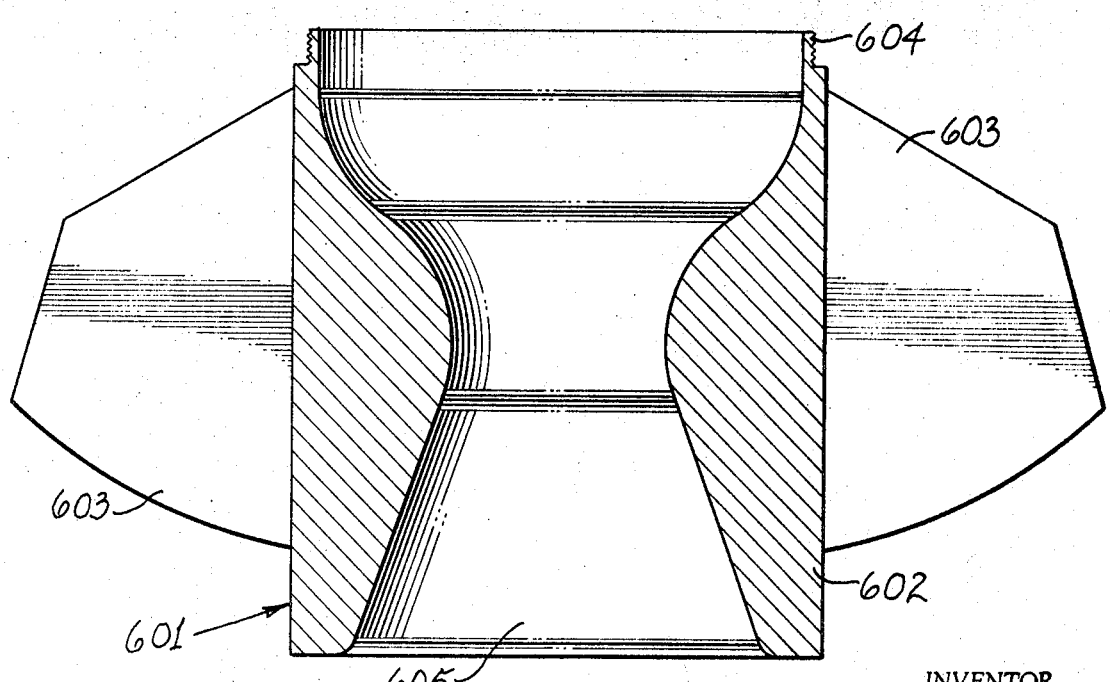
FIG. 7 is a view taken along plane 7—7 of FIG. 6 partly in cross-section and partly in elevation, showing the exhaust nozzle portion and aerodynamic stabilizing members of the rocket.
Figure 8:
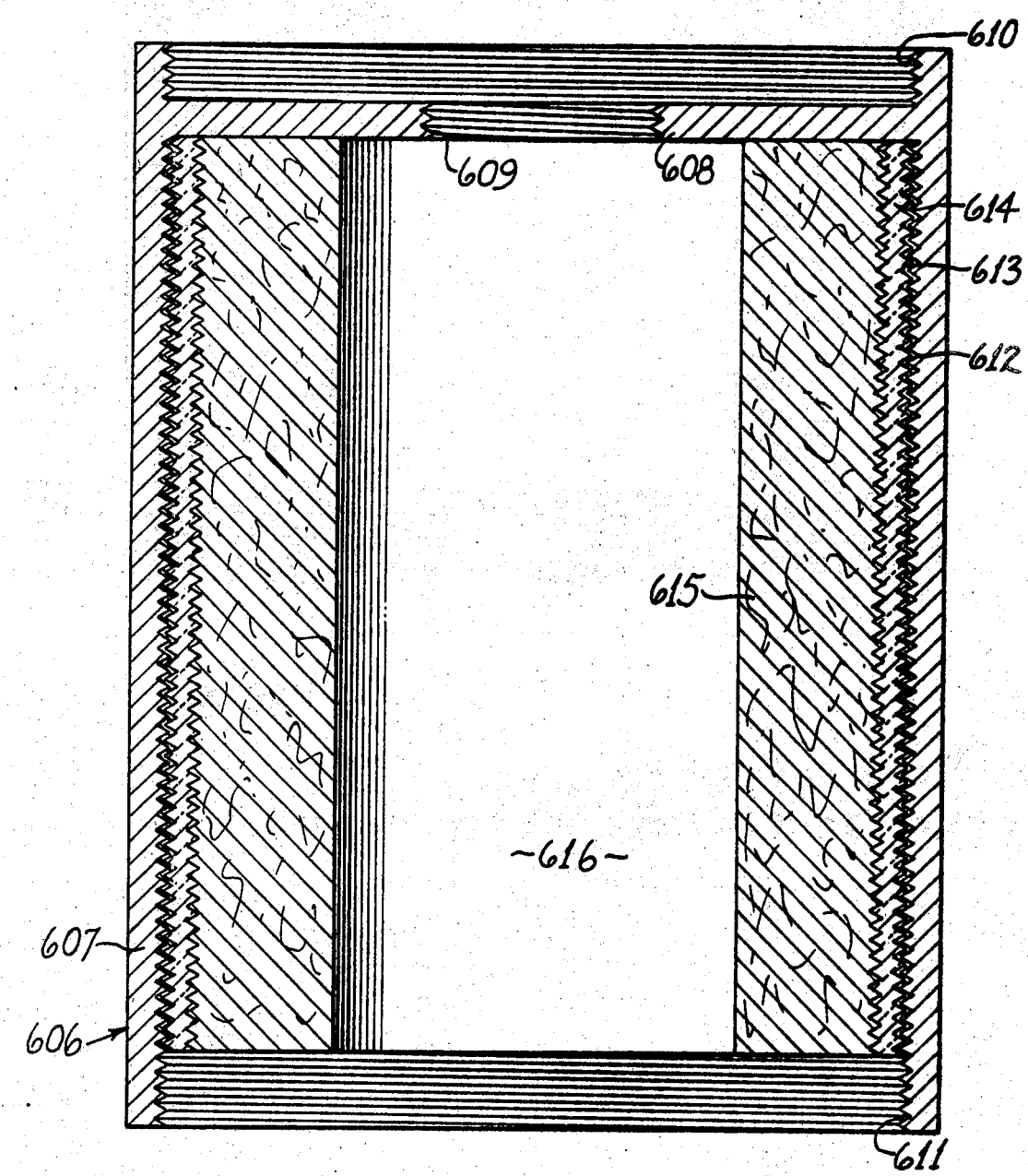
FIG. 8 is a view taken along plane 8—8 of FIG. 6 partly in cross-section and showing details of the rocket motor combustion chamber which retains the non-fluid oxidizer component.

Application of the use of the inverse hybrid rocket 100 to a jet aircraft 300 having an air breathing engine 302 is posible as shown in FIG. 5. Therein, the fuel injector 305, connected normally between the fuel tank and the engine, has rocket 100 connected in series, so that said rocket is interposed between the fuel tank-injector combination and the engine 302. In this way the fuel from fuel tank located in wings 301 will be passed through injector 305, through the pipe connecting the injector to the rocket for injecting the fuel into chamber 18, which by controlling the fuel injection from chamber 18 to oxidizer compartment 25 as hereinabove described, will provide conditioning of the fuel prior to passing the fuel to engine 302. The pipe connecting either nozzle 2 to the fuel input port of engine 302 or in lieu thereof the pipe between engine 302 and rocket 100 may be connected to the aperture in base 5, in this way making rocket 100 a part of the fuel injection system of the aircraft for performing the fuel conditioning stated.

In the main, the importance and novelty of this invention is in-part embodied in the use of a solid oxidizer which reacts hypergolically with fluid fuels to provide high energy and power.

ALTERNATE EXEMPLARY EMBODIMENT OF AN INVERSE HYBRID ROCKET

Referring to FIGS. 6, 7, 8, 9 and 10, an alternate exemplary embodiment of the inverse hybrid rocket is generally provided at 600, which includes the aft section 601, the mid section 606 attached to the aft section, and the forward section 650 attached to the mid section.

The aft section 601 comprises a fuselage 602, aerodynamic stabilizers or wings 603 and has an outer threaded portion of reduced diameter 604 at the forward end thereof where it is attached to the mid section. A nozzle 605 is provided as an integral portion of the fuselage, but in certain instances may be a separate nozzle with multiple degrees of freedom and attached to a controller therefor (not shown) for automatically controlling the angular attitude of the rocket by signal from a guidance and control means (not shown) so as to alter the attitude of the rocket in flight.

The midsection 606 comprises a fuselage 607 and has an injector support structure 608 which is an integral portion of the mid section fuselage and has a threaded aperture 609 therein for threadably engaging therein a two-part fuel injector. The forward end of the fuselage 607 has threads 610 at its internal circumference for providing coupling to the forward section. Also, the aft end of the fuselage 607 has threads 611 at its internal diameter for providing a means for coupling with threads 604 of the aft section 601. The mid portion of fuselage 607 has circumferential threads 612 at its inner diameter which may optionally be coated with a flurohydrocarbon material such as tetrafluropolyethylene 613, also commonly referred to as a Teflon material which is a product of the Du Pont Company, for preventing oxidization of the fuselage 607 when in contact with cylindrically-shaped oxidizer component 615. Oxidizer 615 is non-fluid or solid and may also have threads at its outer surface for making tight contact with a fiberglass cylinder 614 circumjacent oxidizer 615, for strengthening the oxidizer component against dynamic stresses and forces acting thereupon during flight operations of the rocket. The oxidizer may be further strengthened by a process of fabrication involving pouring of the oxidizer in molten state into fuselage 607 while rotating fuselage 607 for obtaining an interlace of the molecules of the oxidizer upon solidification thereof. The oxidizer may be still further strengthened by including therein a small quantity of material such as granular fiberglass while the oxidizer is in molten form, although other materials may be used as well for strengthening the oxidizer. Oxidizer 615 has aperture 616 at its longitudinal axis in which injector assembly 617 is contained. The oxidizer may be of the type that will oxidize and combust hypergolically (on contact) with the fuel and will generally be chromium trioxide, chromic acid anhydride, chromic anhydride or chromic acid. Compounds of iodine may also be used as an oxidizer.

Coaxial cylindrical injector mechanism shown at 617 is inserted into and held in threaded aperture 609 by engagement with threaded seat 620 on the outer cylinder 618 of the injector.

Outer cylinder 618 has regularly spaced apertures 619 of predetermined shape in the wall of the outer cylinder. Inner cylinder 621 of the injector has flanged portion 622 at the aft end thereof integral with body portion 623 of the outer cylinder. The outer cylinder has a pair of oppositely disposed lips 624 and 624′ at the forward end thereof which normally cooperate with arc-shaped portions of a pair of oppositely disposed grooves 625 and 625′. Grooves 625 and 625′ have arc-shaped portions about the outer circumference of the forward end of the outer cylinder and vertical portions, each of which are generally perpendicular to the arc-shaped portions and extending from each end of the arc-shaped to the end of the forward end of the outer cylinder. Hence, the arc-shaped portions are normally in cooperation with the lips, constitutes the means for retension of the inner cylinder within the outer cylinder of the injector, and the means for effecting slidable rotation of the inner cylinder with respect to the outer cylinder. The outer cylinder also has a deformable flange 627 at the lower end of its reduced diameter or its forward end and is used for cooperation with a surface of the end portion or injector support member of the combustion chamber, thereby providing a tight fit to prevent leakage of fuel into the combustion chamber along threaded seat 620.

Inner cylinder 621 is closed at its lower or aft end and has apertures 628 regularly spaced from each other in body 623. Each of these apertures are of similar dimension and shape and have similar spacing between each other as are apertures 619, so as to permit perfect alignment of apertures 619 with apertures 628. Both types of apertures 619 and 628 may be either circular, rectangular elongated or such other shapes as required to provide the proper fuel metering into the combustion chamber at sufficient velocity as required, by angularly rotating the inner cylinder with respect to the outer cylinder.

Bevel geared portion 629 is provided at the end of the reduced portion of the inner cylinder for cooperation with a drive means which is actuated by a control mechanism for rotating the inner cylinder with respect to the outer cylinder thereby permitting fuel entering bore 630 along the longitudinal axis of body 623 and internal body 623. Other drive means such as roughened edges or an abrasive wheel or cylinder may be used to rotate the inner cylinder.

Upper gasket 631 circumjacent the reduced portion of the inner cylinder external to and at the reduced portion of the inner cylinder is provided which is in slidable cooperation with the inner surface of the outer cylinder, and lower gasket 632 which is circumjacent the inner cylinder at flange 622 is in slidable cooperation with the lower end of the outer cylinder. These gaskets are for the purpose of preventing fuel from leaking from the fuel retainer compartment directly into the combustion chamber without passing through apertures 619–628.

During stowage of the rocket after loading with oxidizer and fuel, burst disk 633 at the lower end of the reduced portion of the inner cylinder and attached thereto within bore 630, by welding to the inner wall of body 623, prevents fuel from flowing through the injector into the combustion chamber until the fuel is pressurized, at which time the burst disk will rupture.

Forward section 650 of the rocket is provided for retaining therein the fuel compartment, the control compartment, the pressurizing compartment and the payload compartment. Forward section 650 is comprised of fuselage 651 and an external circumferential threaded portion 652 for mating with inner threaded diameter 610 of the mid section 606. A bulkhead wall 653 separates the fuel compartment from the pressurizing compartment 659. Fuel compartment 654 is formed by fuselage 651, bulkhead wall 653, separator wall 671 between fuel and control compartments and injector support wall 608. Injector control and motor drive compartment 655 is formed by fuselage wall 651, bulkhead wall 653 and injector support wall 608. In addition to the various radio receiving equipment or programmed control circuits that may be used to control the rate of fuel injected by injector 617 into the combustion chamber, a motor which is part of the control system has shaft 656 upon which is mounted bevel gear 657 for engaging gear 629 for controlling the angular rotation of inner cylinder 621 with respect to the outer cylinder 618. When other drive means are used as hereinabove mentioned, then gear 657 may be replaced with an abrasive cylinder or the like. The forward section is further subdivided by bulkhead wall 658 which in combination with fuselage 651 provides a payload compartment 673 for transporting a conventional, nuclear or special type of warhead.

Bulkhead 653 is connected by means of piping 660 to an explosively actuated valve 661. Valve 661 is connected by means of an electrical umbilical cable 662 to an umbilical connector as at 663 used for connecting to control means either on ground, aboard ship, submarine or aircraft or aboard a space platform for launching the rocket. An electrical signal provided at connector 663 by a particular launch control system used, will activate a device internal valve 661 or otherwise open valve 661 to permit an inert pressurizing gas such as helium to be applied to the fuel so as to provide sufficient pressure to the fuel inside compartment 654, thereby bursting disk 633 and permitting fuel to enter the injector.

Pressurizing gas tank 664 containing the pressurizing gas such as helium, is provided in compartment 659. Tank 664 is connected by means of pipe 665 to valve 661. Also pipe 666 connects tank 664 to gas fill valve 667. Valve 667 has pipe 668 connected thereto, the other side of the pipe connected to external gas fill port 669 which is sealed or otherwise closed after the gas has been loaded into tank 664. Vent pipe 670 is provided between the valve and the outer skin of fuselage 651 for providing a means for venting pressurizing tank 664.

Fuel fill port 672 is external to fuselage 651 and is affixed to an opening in the fuselage for providing a means for filling compartment 654 with fluid fuel. After filling, port 672 is sealed or otherwise closed off.

Hence, when compartment 654 is filled with fuel, and tank 644 is filled with gas, and power is applied to connector 663, valve 661 is opened and gas from tank 664 pressurizes the fuel by flowing through pipes 665 and 660 and valve 661 into compartment 654. The pressure applied to the fuel is of sufficient magnitude to rupture disk 633, permitting fuel to flow into bore 630 and into injector 617. When control means 655 drives shaft 656 and gear 657 so as to drive gear 629 a predetermined angle, cylinder 621 rotates several degrees and apertures 619 and 628 will at least partially align to allow fuel to be injected at high pressure and high velocity into aperture 616 and impinge upon the wall of oxidizer 615 thereby creating hypergolic reaction of the fuel with the oxidizer and igniting the fuel, further causing high temperature gases to be created in the combustion chamber as products of this hypergolic reaction which are ejected through nozzle 605 for providing high energy or power or thrust thereat and thereby propelling the rocket. When larger thrust is desired, shaft 656 will be driven for a longer period of time so that larger openings are provided by apertures 619 and 628. Finally, at flight termination and when the rocket is used as an incendiary weapon, the angle of rotation of the inner cylinder of the injector is approximately 90 degrees from the injector-closed position, by automatic programming or by radio or radar controlling signals, controlling the position of the control mechanism 655, so as to align lips 624 and 624' with the vertical portions of grooves 625 and 625', thereby permitting inner cylinder 621 to be forced out by fuel pressure through nozzle 605 and out of the rocket. This action will permit the remaining fuel to be forced through aperture 616 in oxidizer 615 and ignite by hypergolic action therewith and be dumped in ignited form over a predetermined rocket flight termination point, which will also constitute a military objective, thereby burning the area with the ignited fuel, which may be any of the fuels mentioned hereinabove and particularly napalm. Of course, a dual purpose objective may be accomplished; firstly, the delivery of a payload such as a warhead, and secondly, the burning of the area with the remaining fuel. Another possibility is to provide ejection of the payload on one military target and permitting the rocket to fly another distance beyond the point of payload drop to dump ignited fuel on another area of military significance.

Additionally, the alternate embodiment rocket, and particularly the mid and aft sections thereof may be used as depicted in FIGS. 2 through 5 wherein the rocket 600 is used in lieu of the rocket as at 100 in conjunction with a turbo-generator for driving the blades thereof by the high temperature gases exhausted from the nozzle, as a fuel conditioner for conditioning fuel in an aircraft, as a flame-out prevention device to prevent flame-out of a jet aircraft engine, and as a propulsion means for propelling any vehicle.

Although the alternate embodiment of the rocket does not show a communications antenna as in the embodiment at 100, it is understood that a radio receiving and guiding system could be carried thereby having such antenna or other suitable antennae as well as alternately being provided with either an infra-red seeker, any semi-active guidance system or even a fully active guidance system employing radar for transmitting and receiving pulsed signals sent to and received from an enemy vehicle in flight or some other military target.

Additionally, from the standpoint of logistics the rockets may be stored for extremely long lengths of time even when loaded with fuel and oxidizer. A plug may be provided for the nozzle containing solid chemicals which will maintain the combustion chamber free of moisture. An indicator sensing the amount of moisture internal the combustion chamber is part of such plug, and the rockets may be examined periodically for usability at a depot or launch site by simply reading the indicator on the plug, the indicator being part of the plug.

Further the rocket may be fabricated at such low cost due to the fuels and oxidizers being of commercial grade and due to the low cost injection system, that it may be economical and due to the reliability factor logistically extremely practical to utilize the rocket as a simple ballistic weapon and even in multiple battery arrangement so that a plurality of rockets may be launched in groups from several different locations upon the same target area for triangulation of the target area with payloads and/or dumped and ignited fuel, thereby covering the area completely, for achieving a military objective.

I claim:
1. In an inverse hybrid rocket for generating a prime source of energy and having a combustion chamber and a reaction product ejection means, comprising in combination:
    a non-fluid oxidizer component retained in said combustion chamber;
    a fluid fuel component injected in said combustion chamber for combining with said non-fluid oxidizer component in a hypergolic reaction thereby produc- ing high temperature gases as reaction products of said hypergolic reaction, said reaction products being passed through said ejection means for providing power;

a support structure adapted to said combustion chamber having an aperture therein; and a fuel injector retained in said aperture for controlling fuel injection into said combustion chamber, comprising:

an inner and an outer cylinder; and means adapted to said inner cylinder for rotating said inner cylinder and means for controlling the rate of fuel injected into said combustion chamber, and means for aligning said inner cylinder with respect to said outer cylinder at a predetermined position for ejecting the inner cylinder from the outer cylinder and from said rocket.

2. The apparatus as stated in claim 1:

said inner cylinder being closed at the aft end thereof and having a body with regularly spaced apertures therein of predetermined shape, the outer surface of the body having a pair of oppositely disposed grooves where each said groove has a vertical portion and an arc-shaped portion, and said body has a bore along the longitudinal axis thereof;

said outer cylinder being coaxial with said inner cylinder and having a pair of oppositely disposed lips at one end of the outer cylinder for normal slidable cooperation and retention within the arc-shaped portions of said grooves thereby rotatably retaining said inner cylinder in said outer cylinder, said lips being adapted for slidable cooperation with said vertical portions for ejection of said inner cylinder from said outer cylinder, the outer cylinder having apertures therein of similar shape and spacing as the apertures in the body of the inner cylinder for alignment of the apertures of the body with the apertures of the outer cylinder, said one end for holding said outer cylinder within said support structure of the combustion chamber whereby said injector extends into an aperture of the oxidizer component along the longitudinal axis thereof, a deformable flange at said one end for providing a fuel seal upon cooperation of said deformable flange with said support structure of the combustion chamber; and engaging means adapted at said one end for rotating said inner cylinder about its longitudinal axis thereby aligning at least portions of the apertures within the inner and outer cylinders for passing of fuel therethrough into said combustion chamber and for rotating said inner cylinder about its longitudinal axis until said lips are aligned with the vertical portions of said oppositely disposed grooves for ejecting the inner cylinder from the outer cylinder and out of said rocket through said ejection means by pressure of the fuel acting upon the inner cylinder, whereby at flight termination the fuel remaining in the rocket is ejected through the combustion chamber in ignited form and spread over a military target objective.

3. The apparatus as stated in claim 1, in combination with:

a burst disk attached within said inner cylinder to prevent fuel from entering said injector until said bust disk is ruptured by sufficient pressure imposed thereupon by said fuel component.

4. The apparatus as stated in claim 3, wherein said rocket is comprised of:

an aft section containing said nozzle;

a mid section connected to said aft section and containing said oxidizer component and said injector; and a forward section connected to said mid section and containing said fuel and an injector control means therefor and a pressurized system and a payload compartment for transporting a warhead therein.

5. The apparatus as stated in claim 1, including:

means circumjacent said oxidizer component for strengthening the oxidizer component against dynamic stresses acting thereupon.

6. In an inverse hybrid rocket for generating a prime source of energy and having a combustion chamber and a reaction product ejection means, comprising in combination:

a non-fluid oxidizer component retained in said combustion chamber, said non-fluid oxidizer component being selected from the group consisting essentially of chromium trioxide, chromic acid anhydride, chromic anhydride or chromic acid;

a fluid fuel component injected in said combustion chamber for combining with said non-fluid oxidizer component in a hypergolic reaction thereby producting high temperature gases as reaction products of said hypergolic reaction, said reaction products being passed through said ejection means for providing power, said fluid fuel component being at least one compound selected from the group consisting essentially of diesel fuel, paraffin, alcohol, gasoline, jet petroleum, rocket petroleum and napalm;

a support structure adapted to said combustion chamber having an aperture therein; and a fuel injector retained in said aperture for controlling fuel injection into said combustion chamber, comprising:

an inner and an outer cylinder; and means adapted to said inner cylinder for rotating said inner cylinder with respect to said outer cylinder and means for controlling the rate of fuel injected into said combustion chamber.

7. The apparatus as stated in claim 6, including:

a fluro hydrocarbon coating provided on at least a portion of the inner surface of siad combustion chamber for preventing chemical interaction of the oxidizer component with the material of said inner surface.

8. The apparatus as stated in claim 6, wherein said fuel injector comprises:

said inner cylinder being closed at the aft end thereof and having a body with regularly spaced apertures therein of predetermined shape, the outer surface of the body having a pair of oppositely disposed grooves where each said groove has a vertical portion and an arc-shaped portion, and said body has a bore along the lonigtudinal axis thereof;

said outer cyilnder being coaxial with said inner cylinder and having a pair of oppositely disposed lips at one end of the outer cylinder for normal slidable cooperation and retention within the arc-shaped portions of said grooves thereby rotatably retaining said inner cylinder in said outer cylinder, said lips being adapted for slidable cooperation with said vertical portions for ejeciton of said inner cylinder from said outer cylinder, the outer cylinder having apertures therein of similar shape and spacing as the apertures in the body of the inner cylinder for alignment of the apertures of the body with the apertures of the outer cylinder, said one end for holding said outer cylinder within said support structure of the combustion chamber whereby said injector extends into an aperture of the oxidizer component along the longitudinal axis thereof, a deformable flange at said one end for providing a fuel seal upon cooperation of said deformable flange with said support structure of the combustion chamber; and engaging means adapted at said one end for rotating said inner cylinder about its longitudinal axis thereby aligning at least portions of the apertures within the inner and outer cylinders for passing of fuel therethrough into said combustion chamber and for rotating said inner cylinder about its longitudinal axis until said lips are aligned with the vertical portions of said oppositely disposed grooves for ejecting the inner cylinder from the outer cylinder and out of said rocket through said ejection means by pressure of the fuel acting upon the inner cylinder, whereby at flight termination the fuel remaining in the rocket is ejected through the combustion chamber in ignited form and spread over a military target objective.

9. The apparatus as stated in claim 6, in combination with:

a burst disk attached within said inner cylinder to prevent fuel from entering said injector until said burst disk is ruptured by sufficient pressure imposed thereupon by said fuel component.

10. The apparatus as stated in claim 9, wherein said rocket is comprised of:

an aft section containing said nozzle;
a mid section connected to said aft section and containing said oxidizer component and said injector; and
a forward section connected to said mid section and containing said fuel and an injector control means therefor and a pressurizing system and a payload compartment for transporting a warhead therein.

References Cited
FOREIGN PATENTS
862,771    3/1961    Great Britain _____ 23—2.2

CARLTON R. CROYLE, Primary Examiner

U.S. Cl. X.R.

60—39.74, 220, 261, 270, 255; 102—103